(12) United States Patent
Toossi et al.

(10) Patent No.: US 9,033,301 B1
(45) Date of Patent: May 19, 2015

(54) VIBRATION REDUCTION SYSTEM USING AN EXTENDED WASHER

(75) Inventors: Mostafa Toossi, Scottsdale, AZ (US); Murugappan Meyyappa, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 183 days.

(21) Appl. No.: 13/094,004

(22) Filed: Apr. 26, 2011

(51) Int. Cl.
*F16M 13/00* (2006.01)
*E04H 9/02* (2006.01)
*A01B 59/00* (2006.01)
*F16F 15/073* (2006.01)

(52) U.S. Cl.
CPC .............. *E04H 9/021* (2013.01); *A01B 59/00* (2013.01); *F16F 15/073* (2013.01)

(58) Field of Classification Search
USPC ......... 248/560, 559, 564, 566, 568, 570, 599, 248/603, 605, 614, 638, 200, 205.1, 205.7, 248/581, 610, 611, 613, 639, 678, 618, 619, 248/621, 634, 671, 556, 557; 267/136, 153, 267/141, 293
See application file for complete search history.

(56) References Cited

U.S. PATENT DOCUMENTS

| | | | | |
|---|---|---|---|---|
| 2,851,916 A | | 9/1958 | Grandy et al. | |
| 2,893,665 A | * | 7/1959 | Paulsen | 248/615 |
| 3,250,502 A | * | 5/1966 | Robinson | 248/560 |
| 3,502,290 A | * | 3/1970 | Legrand et al. | 248/635 |
| 3,812,802 A | | 5/1974 | Pierce | |
| 3,920,202 A | * | 11/1975 | Mouille | 244/17.27 |
| 4,079,926 A | * | 3/1978 | Nunes | 267/176 |
| 4,458,862 A | * | 7/1984 | Mouille et al. | 244/17.27 |
| 4,482,124 A | * | 11/1984 | Dochterman | 248/604 |
| 4,546,848 A | * | 10/1985 | Iijima et al. | 180/312 |
| 4,783,038 A | * | 11/1988 | Gilbert et al. | 248/570 |
| 4,879,857 A | * | 11/1989 | Peterson et al. | 52/403.1 |
| 5,042,783 A | * | 8/1991 | Ciolczyk et al. | 267/81 |
| 5,062,507 A | * | 11/1991 | Roche | 188/378 |
| 5,131,611 A | * | 7/1992 | Vollaro | 244/173.1 |
| 5,169,110 A | * | 12/1992 | Snaith et al. | 248/570 |
| 5,266,856 A | | 11/1993 | Holter | |
| 5,390,892 A | * | 2/1995 | Platus | 248/619 |
| 5,549,270 A | * | 8/1996 | Platus et al. | 248/619 |
| 5,641,133 A | * | 6/1997 | Toossi | 244/17.27 |
| 5,947,453 A | * | 9/1999 | Eastman et al. | 267/136 |
| 5,984,233 A | * | 11/1999 | Snyder et al. | 244/119 |
| 6,029,959 A | * | 2/2000 | Gran et al. | 267/136 |
| 6,126,136 A | * | 10/2000 | Yen et al. | 248/560 |
| 6,240,799 B1 | * | 6/2001 | Yau | 74/490.03 |
| 6,286,806 B1 | * | 9/2001 | Corcoran | 248/678 |
| 6,311,945 B1 | * | 11/2001 | D'Angelo | 248/632 |
| 6,355,994 B1 | * | 3/2002 | Andeen et al. | 310/15 |
| 6,533,221 B1 | * | 3/2003 | Hubert | 244/173.1 |
| 6,547,205 B2 | * | 4/2003 | Carter et al. | 248/560 |
| 6,695,261 B2 | * | 2/2004 | Cleveland | 244/171.7 |
| 7,086,509 B2 | * | 8/2006 | Cunningham et al. | 188/378 |
| 7,114,711 B2 | * | 10/2006 | Allaei | 267/136 |
| 7,303,184 B1 | * | 12/2007 | Bower et al. | 267/136 |
| 7,331,407 B2 | | 2/2008 | Stirm et al. | |

(Continued)

*Primary Examiner* — Monica Millner
(74) *Attorney, Agent, or Firm* — Yee & Associates, P.C.

(57) ABSTRACT

A method and apparatus comprising an interface section and a vibration reduction structure associated with the interface section. The vibration reduction structure extends from a surface of the interface section. The interface section and the vibration reduction structure are configured to reduce vibrations at a number of frequencies that travel through the interface section and the vibration reduction structure.

18 Claims, 9 Drawing Sheets

(56) References Cited

U.S. PATENT DOCUMENTS

| | | |
|---|---|---|
| 7,588,097 B2 | 9/2009 | Kamegai et al. |
| 7,950,633 B2 * | 5/2011 | Hiley et al. ............... 267/136 |
| 8,089,182 B2 * | 1/2012 | Cho et al. ..................... 310/51 |
| 8,141,813 B2 * | 3/2012 | Pancotti et al. .......... 244/17.27 |
| 8,196,910 B2 * | 6/2012 | Baron ......................... 267/136 |
| 8,262,051 B2 * | 9/2012 | Vo et al. ..................... 248/560 |
| 8,262,068 B1 * | 9/2012 | Monson et al. ............. 267/292 |
| 8,336,687 B2 * | 12/2012 | Kawabata et al. .......... 188/379 |
| 8,353,446 B2 * | 1/2013 | Cox ............................. 232/39 |
| 2002/0158181 A1 * | 10/2002 | Carter et al. ................ 248/560 |
| 2005/0109912 A1 * | 5/2005 | Mulder ....................... 248/564 |
| 2009/0302189 A1 * | 12/2009 | Tetsuda et al. .............. 248/560 |
| 2010/0163704 A1 * | 7/2010 | Bunker ....................... 248/634 |
| 2010/0327142 A1 * | 12/2010 | Vo et al. ..................... 248/560 |
| 2011/0001007 A1 * | 1/2011 | Fox et al. .................... 244/119 |

* cited by examiner

VIBRATION REDUCTION SYSTEM USING AN EXTENDED WASHER

GOVERNMENT LICENSE RIGHTS

This application was made with Government support under contract number W58RGZ-05-C-0001 awarded by the United States Army. The Government has certain rights in this application.

BACKGROUND INFORMATION

1. Field

The present disclosure relates generally to aircraft and, in particular, to structures in an aircraft. Still more particularly, the present disclosure relates to a vibration reduction system using a washer in an aircraft.

2. Background

Vibrations are mechanical oscillations that occur in a structure. These oscillations may have one or more different frequencies and directions.

Oftentimes, vibrations are undesirable in a structure. For example, vibrations may waste energy, cause unwanted sound, prevent the structure from operating properly, cause undesired structural changes, and/or result in unwanted motion. For example, vibrations in engines, electric motors, electronic equipment, and mechanical structures that are in operation are typically undesired.

Vibrations may be caused by various sources. Vibrations, for example, may be generated by a motor, the meshing of gear teeth, rotation of aircraft rotors, and other sources. These vibrations may result in decreased efficiency in these devices. The devices may not be able to operate at desired speeds because of the vibrations or may require increased maintenance.

In an aircraft, different moving parts cause vibrations that may travel through different structures in the aircraft. For example, different rotating structures, such as rotor shafts, blades of propellers, and other types of components may cause vibrations or may be affected by vibrations.

Vibrations may be controlled through various vibration reduction systems placed in the path of the traveling vibrations. For example, a vibration may be reduced through a vibration system in the form of a damper or shock absorber. A damper is a mechanical device designed to reduce vibrations by dissipating kinetic energy. This type of device may reduce the oscillations that occur in a structure. The damper may be a shock absorber connected to two components in an aircraft.

For example, dampers may be used in landing gear, seat mounts, engine mounts, and other types of components in an aircraft. Adding dampers or other types of vibration reduction systems may involve adding components that may weigh more than desired, take up more space than desired, and/or cause undesired relative motion between the components in the aircraft. Additionally, the systems may increase the cost and complexity of an aircraft in a manner that is undesired.

Vibrations traveling through an aircraft also may be reduced by modifying the source of the vibrations in a manner to reduce vibrations generated by the source. For example, changes to engine design, blades, and other structures that move may be used to reduce vibrations in an aircraft.

Changing the design of various components to reduce vibrations in an aircraft may require time and expenses that are undesirable. For example, in redesigning blades for an aircraft, the aircraft may be placed into maintenance such that blades may be modified or replaced for the aircraft. This type of vibration reduction takes the aircraft out of use for some period of time. This unavailability of aircraft may be undesirable.

Therefore, it would be advantageous to have a method and apparatus that takes into account at least some of the issues discussed above, as well as other possible issues.

SUMMARY

In one advantageous embodiment, an apparatus comprises an interface section and a vibration reduction structure associated with the interface section. The vibration reduction structure extends from a surface of the interface section. The interface section and the vibration reduction structure are configured to reduce vibrations at a number of frequencies that travel through the interface section and the vibration reduction structure.

In another advantageous embodiment, an assembly for an aircraft comprises a first component for the aircraft, a second component for the aircraft, and a vibration reduction part. The first component is connected to the second component. The vibration reduction part is located between the first component and the second component. The vibration reduction part comprises a substantially planar member with a number of holes configured to receive a number of fasteners and a number of members extending from a surface of the substantially planar member. In response to a first number of frequencies, the number of members is configured to vibrate at a second number of frequencies substantially equal to at least a portion of the first number of frequencies in the first component such that vibrations are reduced in the second component.

In yet another advantageous embodiment, a method for reducing vibrations in an assembly is provided. A vibration reduction part is identified for use between a first component and a second component. The vibration reduction part comprises an interface section and a vibration reduction structure associated with the interface section. The vibration reduction structure extends from a surface of the interface section. The interface section and the vibration reduction structure are configured to reduce vibrations at a number of frequencies that travel through the interface section and the vibration reduction structure. The first component and the second component are connected with the vibration reduction part between the first component and the second component to form the assembly.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
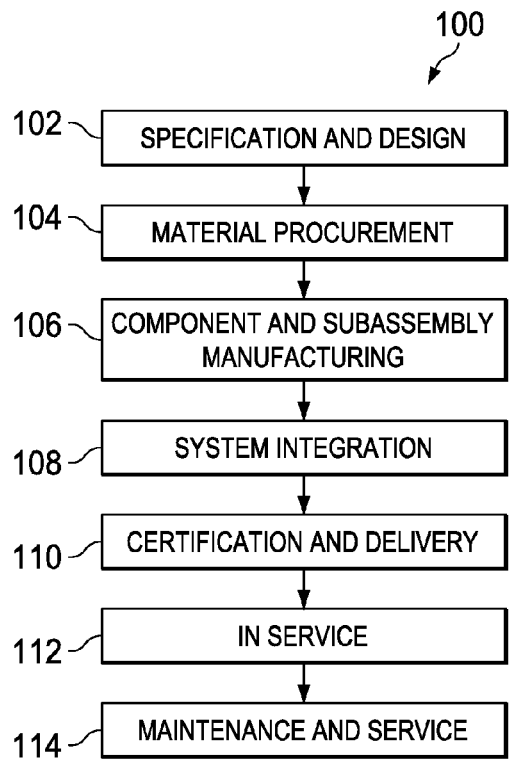
FIG. 1 is an illustration of an aircraft manufacturing and service method in accordance with an advantageous embodiment.
Figure 2:
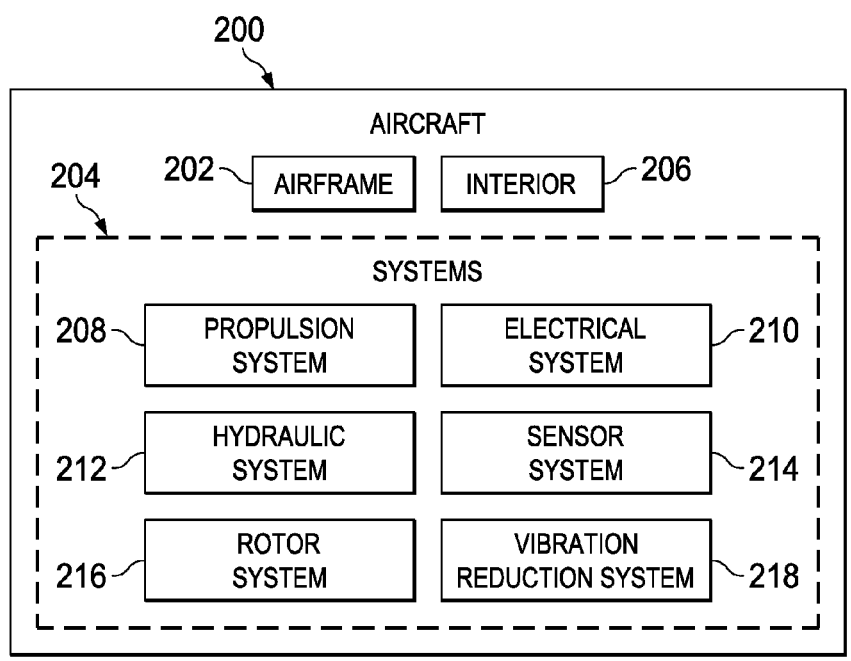
FIG. 2 is an illustration of an aircraft in accordance with an advantageous embodiment.

Referring more particularly to the drawings, embodiments of the disclosure are described in the context of aircraft manufacturing and service method 100 as shown in FIG. 1 and aircraft 200 as shown in FIG. 2. In particular, an advantageous embodiment may be used to reduce vibrations between structures within aircraft 200 in FIG. 2.

Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in accordance with an advantageous embodiment. In this example, aircraft 200 may be a helicopter produced by aircraft manufacturing and service method 100 in FIG. 1 and may include airframe 202 with a plurality of systems 204 and interior 206.

Examples of systems 204 include one or more of propulsion system 208, electrical system 210, hydraulic system 212, sensor system 214, rotor system 216, and vibration reduction system 218. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1.

As one illustrative and non-limiting example, an advantageous embodiment may be used in vibration reduction system 218. Vibration reduction system 218 may be used to reduce vibrations for sensor system 214 when attached to airframe 202 or other portions of aircraft 200.

The different advantageous embodiments recognize and take into account a number of different considerations. For example, the different advantageous embodiments recognize and take into account that many currently-used vibration reduction systems require motion between two structures when reducing vibrations.

The different advantageous embodiments recognize and take into account that when two components are rigidly connected to each other, this type of vibration reduction system may be unusable or undesirable. For example, sensors, cameras, antennas, and other components may be mounted on the fuselage of an aircraft, on a fairing, and/or on other locations on the aircraft. These types of components are typically rigidly connected to each other. With a rigid connection, movement of the two components relative to each other is undesirable.

The different advantageous embodiments recognize and take into account that with a sensor, such as a camera mounted on an aircraft, vibrations through the body of the aircraft to the camera may reduce the quality of video data generated by the camera. For example, as the camera is focused at longer distances, movement of the camera caused by vibrations may decrease the ability of the camera to generate images of a target object with a desired level of quality. As a result, when the quality of the images decreases below some desired level, the images may not be useful for performing analysis or other operations.

The different advantageous embodiments also recognize and take into account that the use of a dampening system, in which the camera moves relative to the structure on which the camera is mounted, may be undesirable when generating images. As a result, the use of currently-available dampening systems may be undesirable in reducing vibrations in the camera.

The different advantageous embodiments recognize and take into account that redesigning or changing the source of the vibrations is one solution for reducing vibrations that reach the camera. This solution, however, may be time consuming and more expensive than desired.

The different advantageous embodiments recognize and take into account that another solution may involve using image stabilization techniques. This technique, however, may not provide the desired amount of stabilization, depending on the amount of vibration present. As a result, the different advantageous embodiments recognize and take into account that the distance at which images may be generated with a desired quality may be reduced when vibrations travel to the camera.

Therefore, the different advantageous embodiments provide a method and apparatus for reducing vibrations between components that are connected to each other. The different advantageous embodiments may be especially useful when the connection between components is a rigid connection.

In one advantageous embodiment, an apparatus comprises an interface section and a vibration reduction structure associated with the interface section. The vibration reduction structure extends from a surface of the interface section. The interface section and the vibration reduction structure are configured to reduce vibrations at a number of frequencies that travel through the interface section and the vibration reduction structure.

Figure 3:
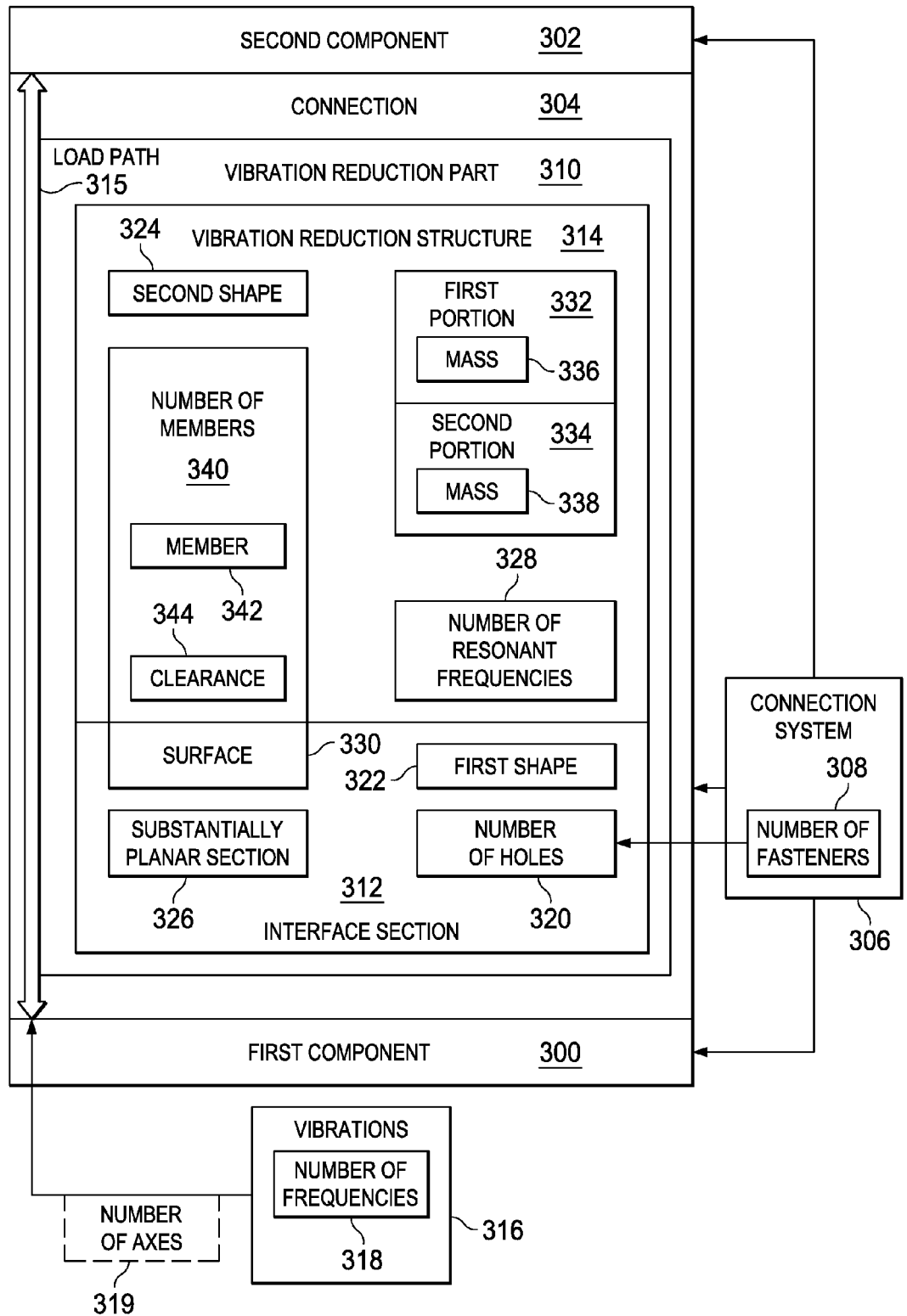
FIG. 3 is an illustration of a block diagram of components used to reduce vibrations between components in an aircraft in accordance with an advantageous embodiment.

With reference now to FIG. 3, an illustration of a block diagram of components used to reduce vibrations between components in an aircraft is depicted in accordance with an advantageous embodiment. In this illustrative example, first component 300 and second component 302 are components within aircraft 200 in FIG. 2. First component 300 and second component 302 are connected to each other at connection 304. In these depicted examples, connection 304 is a rigid connection. In other words, first component 300 and second component 302 may resist and/or may be incapable of bending with respect to each other when connection 304 is a rigid connection.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In these illustrative examples, first component 300 and second component 302 may be connected to each other in a number of different ways at connection 304. For example, these components may be connected to each other using connection system 306 to form connection 304. Connection system 306 may comprise at least one of a number of fasteners, a number of welds, an adhesive, and other suitable types of connectors.

In one illustrative example, connection system 306 may comprise number of fasteners 308. Number of fasteners 308 includes a number of hardware devices that mechanically join or affix two or more components together. Number of fasteners 308 may include, for example, bolts, nuts, rivets, and/or other suitable types of fasteners.

In these illustrative examples, vibration reduction part 310 is located in connection 304 between first component 300 and second component 302. Vibration reduction part 310 is an illustrative example of one or more parts that may be used in vibration reduction system 218 in FIG. 2.

In this particular example, vibration reduction part 310 comprises interface section 312 and vibration reduction structure 314. Vibration reduction structure 314 is associated with interface section 312. For example, vibration reduction structure 314 may be made as part of interface section 312, bonded to interface section 312, welded to interface section 312, or otherwise attached or joined to interface section 312.

Interface section 312 is the portion of vibration reduction part 310 that is configured for placement between first component 300 and second component 302. This placement may be in connection 304 where first component 300 and second component 302 are connected to each other at connection 304.

As depicted, vibration reduction part 310 is placed between first component 300 and second component 302 along load path 315. Load path 315 extends through first component 300 to second component 302 in this illustrative example.

In these illustrative examples, interface section 312 and vibration reduction structure 314 are configured to reduce vibrations 316 at number of frequencies 318 that may travel to interface section 312 and vibration reduction structure 314. For example, different vibrations within vibrations 316 may travel at the same or different frequencies in number of frequencies 318. As one specific example, vibrations 316 may all travel at one frequency.

In these examples, vibrations 316 may travel in the direction of number of axes 319. In particular, interface section 312 and vibration reduction structure 314 may reduce vibrations 316 for at least a portion of number of frequencies 318 along at least a portion of number of axes 319 in these illustrative examples.

When number of fasteners 308 is used in connection system 306, interface section 312 may have number of holes 320. Number of holes 320 is configured to receive number of fasteners 308 when number of fasteners 308 is used to connect first component 300 to second component 302. In this type of implementation, vibration reduction part 310 may also function as a washer. In other words, interface section 312 may help distribute a load of a threaded fastener in number of fasteners 308 in number of holes 320.

In these illustrative examples, interface section 312 has first shape 322, and vibration reduction structure 314 has second shape 324. First shape 322 is a shape that is configured for placement between first component 300 and second component 302 where these components are connected to each other. For example, first shape 322 may be such that interface section 312 takes the form of substantially planar section 326.

First shape 322 may have other forms in addition to that of substantially planar section 326 in these illustrative examples. For example, without limitation, first shape 322 also may be circular, square, triangular, hexagonal, octagonal, irregular, or some other suitable shape that is substantially planar. In still other examples, first shape 322 may not be planar. For example, first shape 322 may be curved or have any shape that allows for connection 304 to be made between first component 300 and second component 302.

Second shape 324 for vibration reduction structure 314 is configured such that vibration reduction structure 314 vibrates at number of resonant frequencies 328. Number of resonant frequencies 328 is substantially equal to at least a portion of number of frequencies 318. This vibration of vibration reduction structure 314 may reduce vibrations 316 when vibrations 316 reach vibration reduction part 310. In these examples, vibrations 316 are reduced in vibration reduction part 310 by vibration reduction structure 314.

Interface section 312 and vibration reduction structure 314 in vibration reduction part 310 may be comprised of a number of different types of materials. For example, interface section 312 and vibration reduction structure 314 may be comprised of a material selected from at least one of aluminum, titanium, steel, nickel, plastic, a composite material, and/or other suitable types of materials.

The selection of materials may be based on factors including at least one of materials used in first component 300, materials used in second component 302, the type of fastener used in number of fasteners 308, the load to be carried by interface section 312, and/or other suitable factors. Further, interface section 312 and vibration reduction structure 314 each may be comprised of the same materials or different materials, depending on the particular implementation.

With vibration reduction part 310 located between first component 300 and second component 302 at connection 304, vibrations 316 at number of frequencies 318 may be reduced or eliminated when vibrations travel through or into vibration reduction part 310.

For example, vibrations 316 in first component 300 may travel through vibration reduction part 310. Vibration reduction part 310 may reduce vibrations 316 such that vibrations 316 that travel into second component 302 may be reduced and/or eliminated. In other words, vibrations 316 may be reduced in an amount that does not affect a desired operation of second component 302.

Interface section 312 and vibration reduction structure 314 may have various configurations such that vibrations 316 may be reduced when vibrations 316 reach vibration reduction part 310.

In these illustrative examples, vibration reduction structure 314 extends from surface 330 of interface section 312. Vibration reduction structure 314 may have first portion 332 and second portion 334. First portion 332 may have mass 336 that is greater than mass 338 of second portion 334. First portion 332 and second portion 334 in vibration reduction structure 314 are configured to move when vibrations 316 reach vibration reduction structure 314 in a manner that reduces vibrations 316. This configuration of vibration reduction structure 314 may include a selection of second shape 324, materials in vibration reduction structure 314, and/or other suitable parameters that may reduce vibrations 316.

The movement of vibration reduction structure 314 is such that a reduction in vibrations 316 traveling from first component 300 to second component 302 occurs. The movement of first portion 332 and second portion 334 in vibration reduction structure 314 may be a bending movement that may result in first portion 332 oscillating or vibrating.

In one illustrative example, vibration reduction structure 314 may comprise number of members 340 that extend from surface 330 of interface section 312. Number of members 340 may be divided such that a first portion of each of these members is part of first portion 332, and a second portion of each of these members is part of second portion 334.

Number of members 340 extends from surface 330 of interface section 312 such that number of members 340 is able to bend or vibrate when vibrations 316 reach vibration reduction part 310.

For example, member 342 in number of members 340 has clearance 344. Clearance 344 is relative to first component 300 and second component 302. In other words, clearance 344 is such that member 342 may move in response to vibrations 316 reaching vibration reduction part 310.

With the use of vibration reduction part 310 between first component 300 and second component 302, vibrations 316 that travel along load path 315 may be reduced or eliminated before reaching second component 302. In this manner, undesired movement of second component 302 may be reduced or eliminated.

As a result, vibration reduction part 310 may be especially useful with components that are rigidly connected to each other. Vibration reduction part 310 may be used when other types of dampening systems that require movement between first component 300 and second component 302 are undesirable.

The illustration of vibration reduction part 310 and its use with first component 300 and second component 302 in FIG. 3 is not meant to imply physical or architectural limitations to the manner in which different advantageous embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in other illustrative examples, an additional vibration reduction part in addition to vibration reduction part 310 may be located between first component 300 and second component 302.

As another illustrative example, another component in addition to first component 300 and second component 302 may be connected to first component 300 and second component 302 at connection 304. In this illustrative example, vibration reduction part 310 also may be part of connection 304 with these three components.

As yet another example, the different advantageous embodiments may be used with other types of platforms other than aircraft. For example, without limitation, the platform may be selected from one of a mobile platform, a stationary platform, a land-based structure, an aquatic-based structure, a space-based structure, a helicopter, a submarine, a bus, a personnel carrier, a tank, a train, an automobile, a spacecraft, a space station, a satellite, a surface ship, a power plant, a dam, and a manufacturing facility.

Further, in these illustrative examples, first component 300 may be selected from one of a fuselage, a fairing, an engine, a skin panel, and/or some other suitable type of component. Second component 302 may be selected from one of a sensor, an infrared camera, a video camera, an antenna, and/or some other suitable type of component.

In some illustrative examples, first component 300 may be connected to second component 302 by first component 300 being connected to vibration reduction part 310 and vibration reduction part 310 being connected to second component 302. This connection may be made using an adhesive, a bonding material, or some other suitable mechanism.

Figure 4:
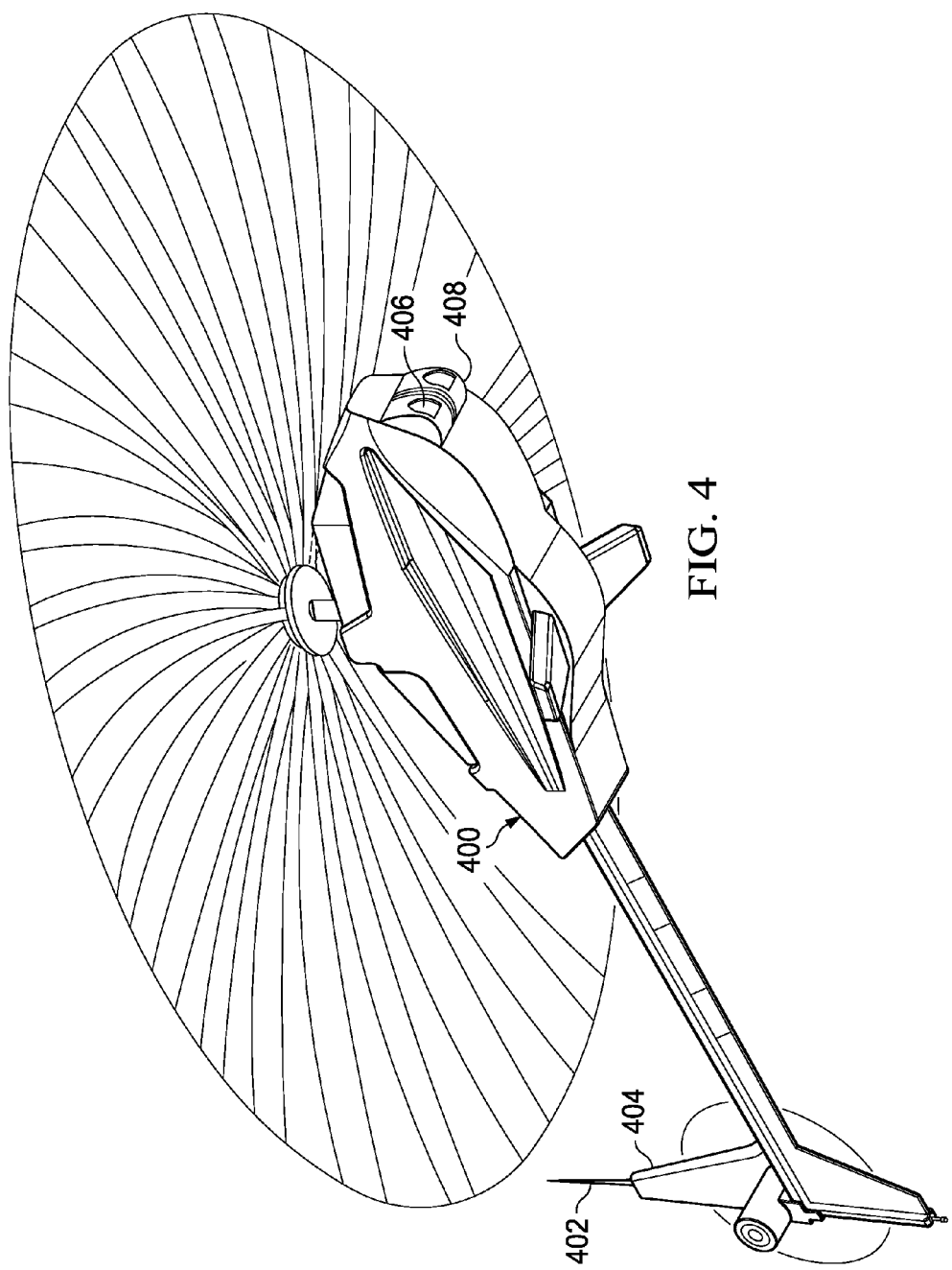
FIG. 4 is an illustration of a helicopter in accordance with an advantageous embodiment.

With reference next to FIG. 4, an illustration of a helicopter is depicted in accordance with an advantageous embodiment. In this illustrative example, helicopter 400 is an example of aircraft 200 in FIG. 2.

As depicted on helicopter 400, antenna 402 is attached to fairing 404. Camera 406 is connected to housing 408 on helicopter 400. In these illustrative examples, it is desirable for antenna 402 and camera 406 to be rigidly attached.

Fairing 404 is an example of first component 300 in FIG. 3. Antenna 402 is an example of second component 302 in FIG. 3. In a similar fashion, housing 408 is an example of first component 300, and camera 406 is an example of second component 302 in FIG. 3. In these illustrative examples, vibration reduction part 310 in FIG. 3 may be used to connect housing 408 and camera 406 to each other in a manner that reduces vibrations. This vibration reduction may be performed without needing movement between the different components.

FIGS. 5-8 illustrate different views of a vibration reduction part in accordance with an advantageous embodiment. The components depicted in FIGS. 5-11 may be combined with components in FIG. 3, used with components in FIG. 3, or a combination of the two. Additionally, some of the components in FIGS. 5-11 may be illustrative of how the components shown in block form in FIG. 3 can be implemented as physical structures.

Figure 5:
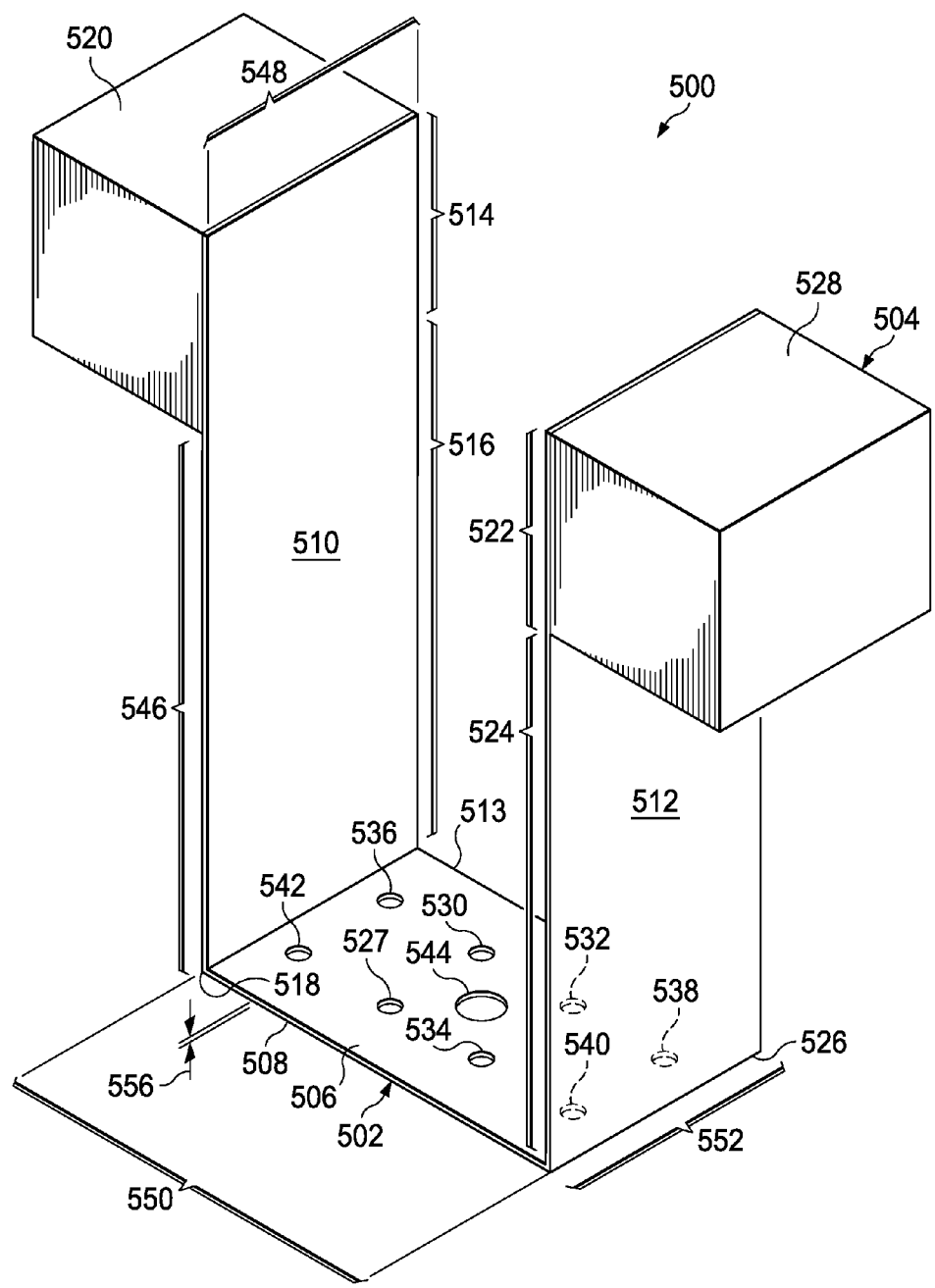
FIG. 5 is an illustration of a vibration reduction part in accordance with an advantageous embodiment.

With reference first to FIG. 5, an illustration of a vibration reduction part is depicted in accordance with an advantageous embodiment. In this illustrative example, vibration reduction part 500 is an example of one physical implementation of vibration reduction part 310 shown in block form in FIG. 3.

As illustrated, vibration reduction part 500 is shown in a perspective view in FIG. 5. Vibration reduction part 500 comprises interface section 502 and vibration reduction structure 504. Interface section 502 has side 506 and side 508. These two sides are opposite to each other. In this illustrative example, vibration reduction part 500 is comprised of aluminum.

Vibration reduction structure 504 includes member 510 and member 512. Member 510 and member 512 extend from surface 513 of interface section 502 on side 506.

In this illustrative example, member 510 has first portion 514 and second portion 516. End 518 of second portion 516 of member 510 is at surface 513 of interface section 502. End 520 of first portion 514 on member 510 is located away from surface 513. In other words, end 518 is opposite of end 520.

Member 512 has first portion 522 and second portion 524. In a similar fashion, end 526 of second portion 524 is located at surface 513, and end 528 of first portion 522 is located away from surface 513. These two ends are also opposite of each other.

In these illustrative examples, first portion 514 and first portion 522 each have a greater mass than second portion 516 and second portion 524, respectively. Member 510 and member 512 are configured such that they may bend, oscillate, vibrate, or otherwise move in a manner that reduces vibrations that reach vibration reduction part 500.

Further, in these illustrative examples, interface section 502 has holes 527, 530, 532, and 534. These holes may receive fasteners used to connect antenna 402 to fairing 404 in FIG. 4. Additionally, interface section 502 also has holes 536, 538, 540, and 542. These holes may be used to receive fasteners to provide an additional connection between interface section 502 of vibration reduction part 500 and fairing 404 in FIG. 4.

In addition, hole 544 also is present in interface section 502. Hole 544 may be used to run cables or other wires between antenna 402 and fairing 404 in FIG. 4. In these illustrative examples, antenna 402 may contact side 506 on interface section 502. Fairing 404 may contact side 508 on interface section 502.

Vibration reduction part 500 may have different shapes. These shapes may be described using different dimensions for different parts of vibration reduction part 500. Further, these dimensions may vary, depending on the particular implementation. In one illustrative example, member 510 has length 546. Length 546 is about 3.5 inches in this example. Member 510 has width 548. Width 548 is about 1.25 inches in this example. Member 512 may have similar dimensions to member 510 in this illustrative example. Length 546 may be from about 2.0 inches to about 4.0 inches. Width 548 may have a range from about 1.0 inches to about 2.0 inches. The ratio of width 548 to length 546 may be from about 0.25 to 1 to about 0.5 to 1 in this illustrative example.

As illustrated, interface section 502 has length 550 and width 552. Thicknesses 556 of interface section 502 and second portion 516 of member 510 and second portion 524 of member 512 are about 0.063 inches. Thicknesses 556 may have a range from about 0.032 inches to about 0.08 inches for this particular illustrative example.

Of course, other dimensions may be present, depending on the particular implementation and the vibrations to be reduced. In this example, first portion 514 and first portion 522 each weigh about half a pound. Other weights may be used, in these examples, depending on the frequency of the vibration to be reduced.

Figure 6:
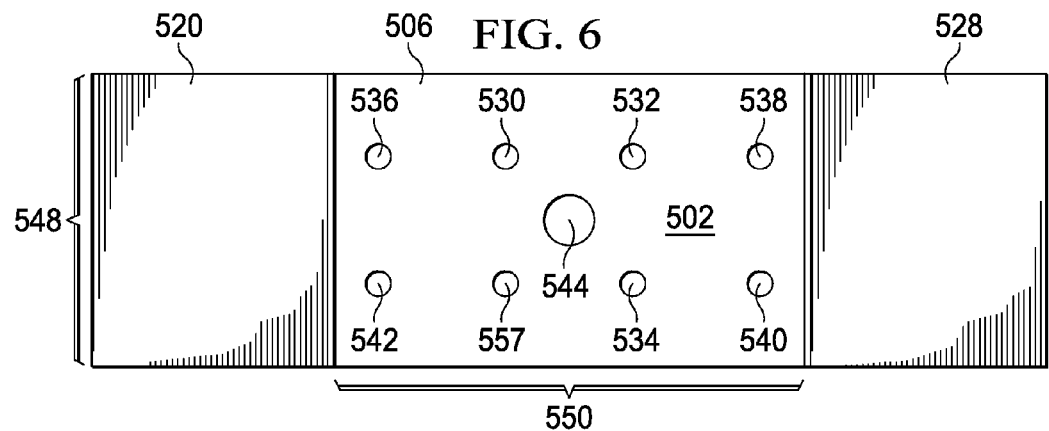
FIG. 6 is an illustration of a top view of a vibration reduction part in accordance with an advantageous embodiment.
Figure 7:
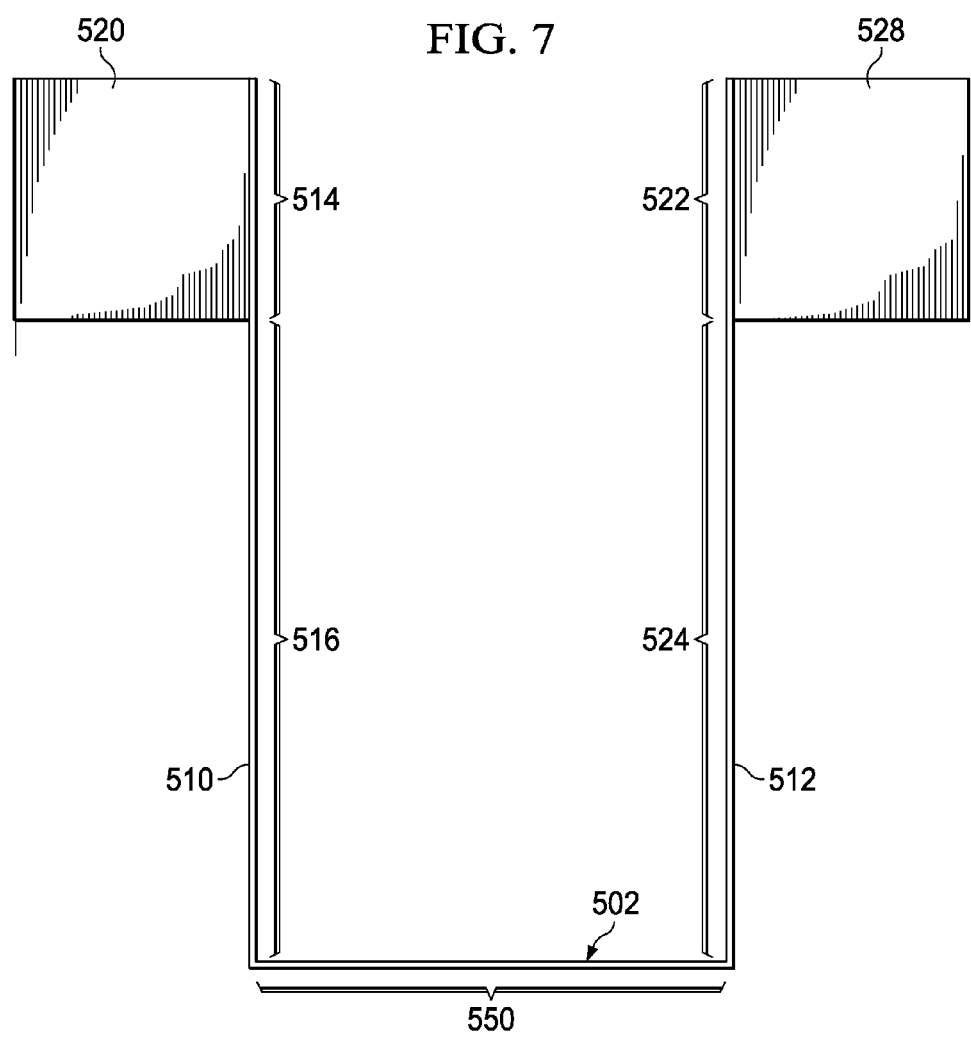
FIG. 7 is an illustration of a side view of a vibration reduction part in accordance with an advantageous embodiment.
Figure 8:
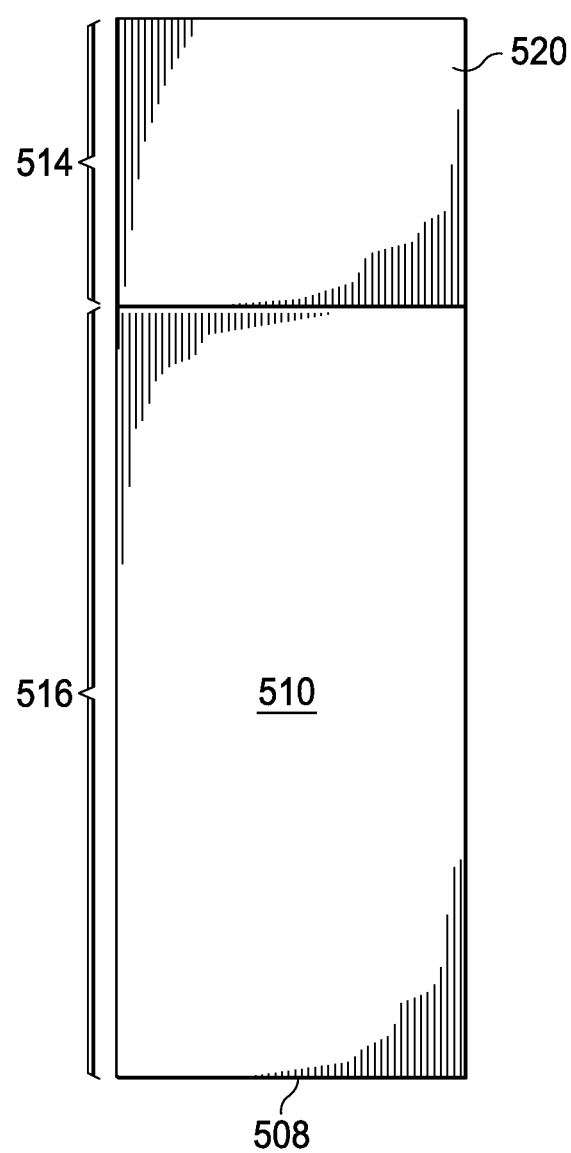
FIG. 8 is an illustration of another side view of a vibration reduction part in accordance with an advantageous embodiment.

With reference now to FIG. 6, an illustration of a top view of vibration reduction part 500 is depicted in accordance with an advantageous embodiment. In FIG. 7, an illustration of a side view of vibration reduction part 500 is depicted in accordance with an advantageous embodiment. Turning to FIG. 8, an illustration of another side view of vibration reduction part 500 is depicted in accordance with an advantageous embodiment.

Figure 9:
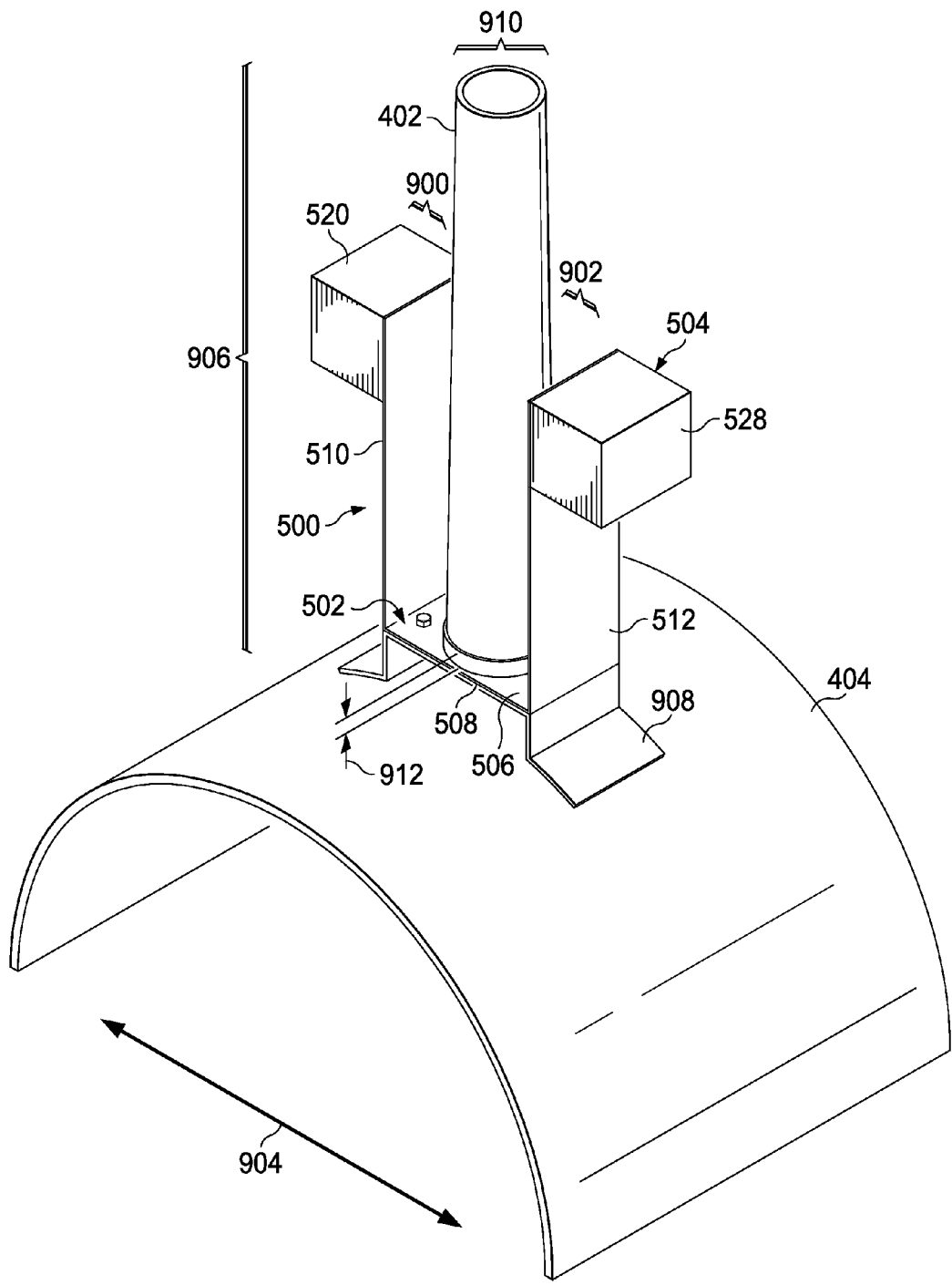
FIG. 9 is an illustration of a vibration reduction part located between two components for a helicopter in accordance with an advantageous embodiment.

With reference now to FIG. 9, an illustration of a vibration reduction part located between two components for a helicopter is depicted in accordance with an advantageous embodiment. In this illustrative example, vibration reduction part 500 is shown located between antenna 402 and fairing 404 for helicopter 400 in FIG. 4.

As can be seen, member 510 has clearance 900, and member 512 has clearance 902. Clearance 900 and clearance 902 are distances between member 510 and member 512 to antenna 402. Clearance 900 and clearance 902 are selected such that movement of member 510 and member 512 in response to vibrations do not contact antenna 402 in an undesired manner. In this illustrative example, vibrations move in a direction along arrow 904.

In this illustrative example, antenna 402 has length 906. Base 908 of antenna 402 has diameter 910. In this example, diameter 910 is about 1.25 inches. Base 908 has thickness 912, which is about 0.125 inches in this example. Diameter 910 may have a range from about 1.0.032 inches to about 2.9 inches for this depicted example. Thickness 912 may have a range from about 0.1 inches to about 0.25 inches for this particular illustrative example.

As depicted, vibration reduction part 500 is located between antenna 402 and fairing 404 when antenna 402 is connected to fairing 404. In the depicted examples, vibration reduction part 500 acts as a washer or other structure that is part of the connection between these two components.

In this illustrative example, member 510 and member 512 have a resonant frequency of about 20 hertz in the direction of arrow 904. Arrow 904 extends in a lateral direction relative to member 510 and member 512. As a result, vibration applied to fairing 404 in the direction of arrow 904 may be absorbed and/or reduced by member 510 and member 512 in vibration reduction part 500. In this manner, antenna 402 may encounter lower vibration levels.

The attenuation or reduction of vibrations at base 908 of antenna 402 may be about 80 percent or more. For example, if fairing 404 and antenna 402 encounter an acceleration level of about 11 or about 386 inches/second$^2$ at a frequency of about 20 hertz applied to the bottom edges of fairing 404, base 908 may experience accelerations at about 500 inches/second² without the use of vibration reduction part 500. With the use of vibration reduction part 500, the lateral accelerations of base 908 may be reduced to about 90 inches/seconds².

The illustration of vibration reduction part 500 in FIGS. 5-9 is only intended as an illustration of one manner in which vibration reduction part 310 may be implemented as a physical structure and one example of components for which vibration reduction part 310 may be used with reducing vibrations 316 in FIG. 3. Of course, these illustrations are not meant to limit the manner in which an advantageous embodiment may be implemented.

Vibration reduction part 310 in FIG. 3 may be implemented in other ways, depending on the particular example. For example, in some illustrative examples, holes 536, 538, 540, and 542 in FIGS. 5 and 6 may be unnecessary. In yet other examples, hole 544 also may be omitted. In still other illustrative examples, interface section 502 may have a different shape other than the one depicted in FIG. 5. Further, fewer or additional members may be used in place of member 510 and member 512 in this example.

Still further, in another physical implementation of vibration reduction part 310, vibration reduction structure 314 may only have a single member in number of members 340 in FIG. 3. In other examples, number of members 340 may be three members, four members, or some other suitable number of members. Further, clearance 344 for different members in number of members 340 may be different, depending on the shape of first component 300, second component 302, or both.

Figure 10:
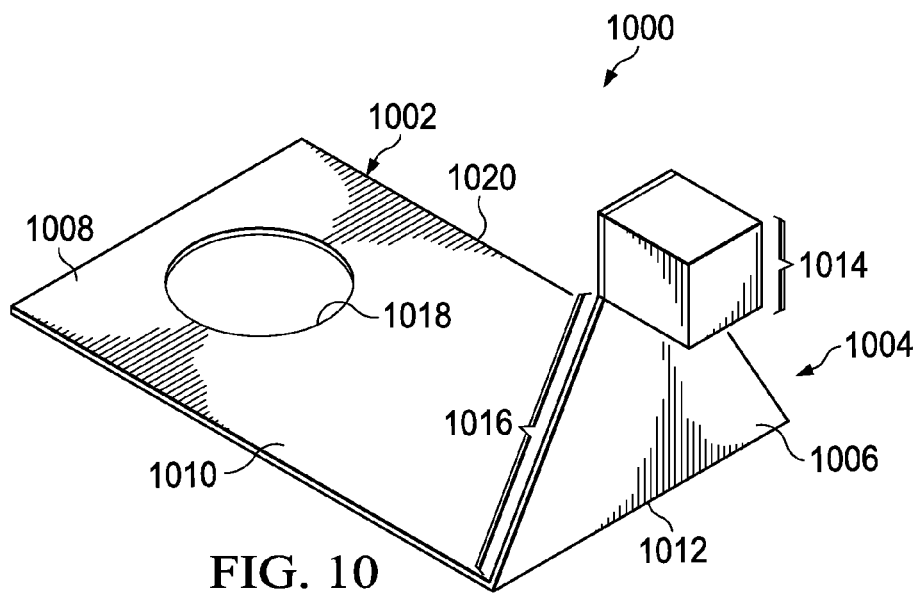
FIG. 10 is an illustration of a schematic for a vibration reduction part in accordance with an advantageous embodiment.

With reference now to FIG. 10, an illustration of a vibration reduction part is depicted in accordance with an advantageous embodiment. In this depicted example, vibration reduction part 1000 is an example of another physical implementation of vibration reduction part 310 shown in block form in FIG. 3.

As depicted, vibration reduction part 1000 has interface section 1002 and vibration reduction structure 1004. In this illustrative example, interface section 1002 has a substantially planar and rectangular shape and is an example of substantially planar section 326 in FIG. 3. Vibration reduction structure 1004 comprises member 1006. Member 1006 is an example of number of members 340 in FIG. 3.

In this illustrative example, vibration reduction structure 1004 extends from surface 1008 on side 1010 of interface section 1002. In particular, member 1006 extends from surface 1008 at edge 1012 of interface section 1002. Member 1006 has first portion 1014 and second portion 1016. First portion 1014 has a greater mass than second portion 1016.

As depicted, the configuration and shape of member 1006 and interface section 1002 are configured to reduce vibrations that may reach vibration reduction part 1000. In other words, member 1006 may move or vibrate at a number of frequencies that may be substantially equal to at least a portion of the frequencies for which vibration reduction may be desired.

In this illustrative example, interface section 1002 has hole 1018. Hole 1018 is configured to receive a fastener that connects first component 300 to second component 302 in FIG. 3. In these illustrative examples, first component 300 may be located on side 1020, while second component 302 may be located on side 1010.

Figure 11:
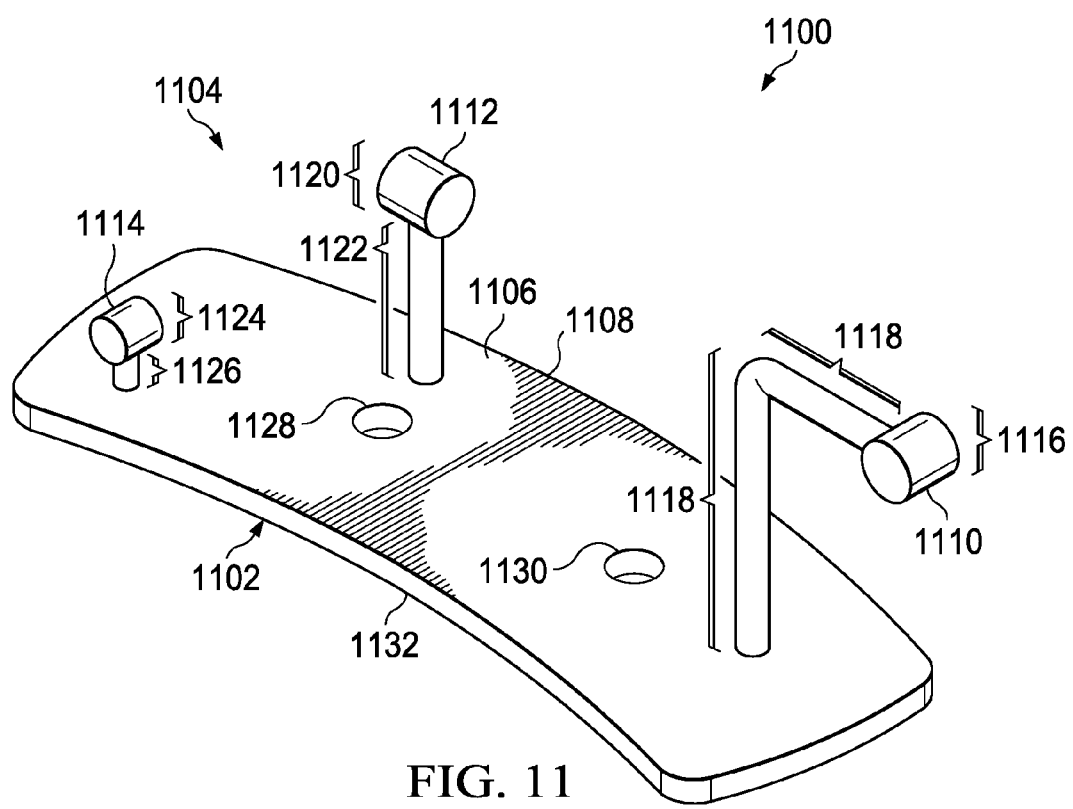
FIG. 11 is an illustration of a schematic for another vibration reduction part in accordance with an advantageous embodiment.

With reference now to FIG. 11, an illustration of another vibration reduction part is depicted in accordance with an advantageous embodiment. In this illustrative example, vibration reduction part 1100 is yet another example of a physical implementation for vibration reduction part 310 shown in block form in FIG. 3.

As depicted, vibration reduction part 1100 has interface section 1102 and vibration reduction structure 1104. In this illustrative example, vibration reduction structure 1104 extends from surface 1106 on side 1108 of interface section 1102.

In these depicted examples, vibration reduction structure 1104 comprises members 1110, 1112, and 1114. Members 1110, 1112, and 1114 are examples of implementations for number of members 340 in FIG. 3.

In this illustrative example, member 1110 has first portion 1116 and second portion 1118. Member 1112 has first portion 1120 and second portion 1122. Member 1114 has first portion 1124 and second portion 1126. In these illustrative examples, first portions 1116, 1120, and 1124 have a greater mass, as compared to second portions 1118, 1122, and 1126, respectively.

As depicted, interface section 1102 does not have a substantially planar shape. Instead, interface section 1102 has a curved shape. The shape of interface section 1102 is configured for placement between first component 300 and second component 302 in FIG. 3. The configuration for the shape of interface section 1102 depends on the manner and shape of first component 300 and second component 302 at connection 304 in FIG. 3. In this illustrative example, first component 300 may be located on side 1132, while second component 302 may be located on side 1108.

As depicted, hole 1128 and hole 1130 are present in interface section 1102. Of course, depending on the manner in which first component 300 is connected to second component 302, hole 1128 and hole 1130 may be omitted.

Figure 12:
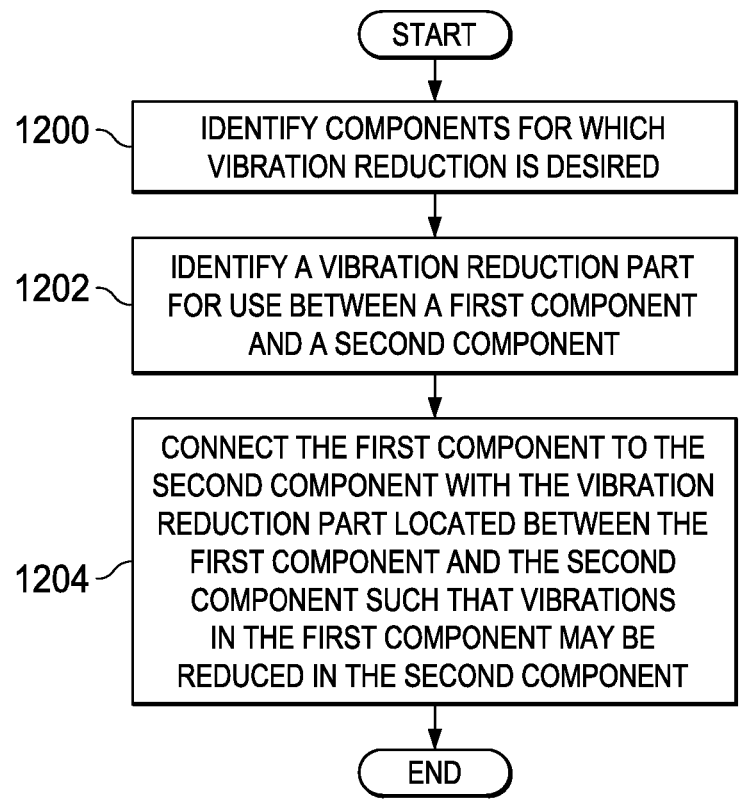
FIG. 12 is an illustration of a flowchart of a process for reducing vibrations in an assembly in accordance with an advantageous embodiment.

With reference now to FIG. 12, an illustration of a flowchart of a process for reducing vibrations in an assembly is depicted in accordance with an advantageous embodiment. In this illustrative example, the process may be implemented such that vibrations 316 in first component 300 may be reduced or prevented from reaching second component 302 in FIG. 3.

In these illustrative examples, the process begins by identifying components for which vibration reduction is desired (operation 1200). These components may be two or more components that are to be connected to each other in these illustrative examples. For example, these components may be first component 300 and second component 302 that are to be connected to each other with connection 304.

In particular, connection 304 may be a rigid connection for which vibrations in one or more of the components may be undesired. The reduction in vibrations may be desirable to allow for proper operation of one or more of the components or to reduce maintenance for the components connected to each other.

Next, the process identifies vibration reduction part 310 for use between first component 300 and second component 302 (operation 1202). Vibration reduction part 310 comprises an interface section and a vibration reduction structure associated with the interface section in which the vibration reduction structure extends from a surface of the interface section. The interface section and the vibration reduction structure are configured to reduce the vibrations at a number of frequencies that travel through the interface section and the vibration reduction structure.

Operation 1202 may be implemented in a number of different ways. For example, operation 1202 may involve selecting vibration reduction part 310 from available vibration reduction parts.

In still other illustrative examples, operation 1202 may include designing vibration reduction part 310. This design may include selecting materials, dimensions, and other parameters for vibration reduction part 310. In selecting the different parameters for vibration reduction part 310, an identification of a number of vibrations in a number of directions for which reduction is desired is identified in this design process. After the design of vibration reduction part 310, the part may be manufactured as part of operation 1202 in these illustrative examples.

Thereafter, the process connects first component 300 to second component 302 with vibration reduction part 310 located between first component 300 and second component 302 such that vibrations 316 in first component 300 may be reduced in second component 302 (operation 1204), with the process terminating thereafter. The connection of first component 300 to second component 302 with vibration reduction part 310 located between first component 300 and second component 302 forms an assembly in these illustrative examples. In operation 1204, vibration reduction part 310 is located in connection 304 between first component 300 and second component 302.

Figure 13:
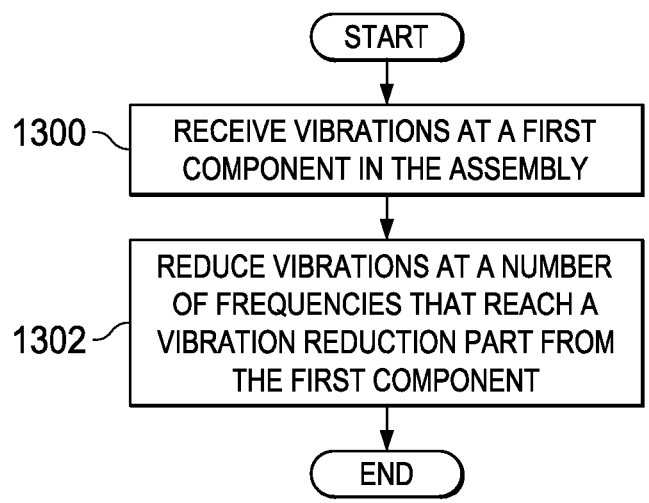
FIG. 13 is an illustration of a flowchart of a process for reducing vibrations in accordance with an advantageous embodiment.

With reference now to FIG. 13, an illustration of a flowchart of a process for reducing vibrations is depicted in accordance with an advantageous embodiment. The process illustrated in FIG. 13 may be used to reduce vibrations in an assembly, such as one comprising first component 300, second component 302, and vibration reduction part 310 located between first component 300 and second component 302.

The process begins by receiving vibrations at first component 300 in the assembly (operation 1300). Vibration reduction part 310, with its location between first component 300 and second component 302, may reduce vibrations that reach vibration reduction part 310 from first component 300. In these illustrative examples, vibration reduction part 310 comprises vibration reduction structure 314 and interface section 312.

The process reduces vibrations 316 at number of frequencies 318 that reach vibration reduction part 310 from first component 300 (operation 1302), with the process terminating thereafter. This reduction in vibrations 316 is performed in operation 1302 using vibration reduction part 310. One or both of vibration reduction structure 314 and interface section 312 in vibration reduction part 310 reduce vibrations 316 that reach vibration reduction part 310. This reduction in vibrations 316 may be such that vibrations 316 reaching second component 302 may be reduced to a desired level.

The flowchart and block diagrams in the different depicted embodiments illustrate the architecture, functionality, and operation of some possible implementations of apparatus and methods in an advantageous embodiment. In this regard, each block in the flowchart or block diagrams may represent a particular module, segment, function, component, and/or portion of an operation or step. For example, one or more of the blocks in the flowchart may be implemented in different orders or may have additional operations that occur. In other words, other blocks may be added in addition to the illustrative blocks in the flowchart.

Thus, the different advantageous embodiments provide a method and apparatus for reducing vibrations in components. In one illustrative example of an advantageous embodiment, an apparatus comprises an interface section and a vibration reduction structure associated with the interface section. The vibration reduction structure extends from a surface of the interface section. The interface section and the vibration reduction structure are configured to reduce vibrations at a number of frequencies that travel through the interface section and the vibration reduction structure.

With the use of vibration reduction parts, such as vibration reduction part 310 in FIG. 3, vibrations in components may be reduced. These vibrations may be reduced without movement between the components. Further, these vibrations may be reduced through placement of the vibration reduction part along a load path of the components. The reduction of vibrations may allow for more desirable operation of a component, as well as reduce maintenance.

Vibration reduction part 310 may cost less and require less maintenance than other types of vibration reduction systems, such as shocks. Also, vibration reduction part 310 may be suitable for use in reducing vibrations in components that are rigidly connected to each other and where movement between the components is undesirable.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for reducing vibrations comprising:
an interface section having a first side and a second side positioned opposite each other; and
a vibration reduction structure attached to the first side and the second side of the interface section associated with the interface section
in which the vibration reduction structure extends vertically from the first side and the second side of the interface section,
wherein the interface section and the vibration reduction structure reduce vibrations at a number of frequencies that travel through the interface section and the vibration reduction structure,
the vibration reduction structure comprising a number of members extending from a side opposite of the interface section,
each member in the number of members comprising
a first portion having a first mass and
a second portion having a second mass,
the first mass greater than the second mass,
wherein
the interface section is positioned between a first component and a second component that are connected to each other,
the interface section forms a substantially planar section that extends between each member of the vibration reduction structure,
the first component positioned on the first side of the interface section and the second component positioned opposite on the second side of the interface section, and
wherein
the interface section and the vibration reduction structure reduce the vibrations at the number of frequencies that encounter the interface section and the vibration reduction structure such that the vibrations in the first component that reach the second component are reduced,
the number of members are positioned with a clearance to the second component,
the second component comprising an antenna, a member in the number of members moving in response to the vibrations in a manner that reduces the vibrations, and a movement of the member is in a lateral direction with respect to the antenna.

2. The apparatus of claim 1, wherein the vibrations at the number of frequencies travel in a direction of a number of axes and wherein the interface section and the vibration reduction structure are configured to reduce the vibrations in at least a portion of a number of directions for at least a portion of the number of frequencies.

3. The apparatus of claim 1, wherein the vibration reduction structure is configured to vibrate at a number of resonant frequencies that is substantially equal to at least a portion of the number of frequencies.

4. The apparatus of claim 1, wherein the interface section is a substantially planar section and the first side and the second sides are positioned on opposite sides of the planar section.

5. The apparatus of claim 1 further comprising:
a number of holes in the interface section.

6. The apparatus of claim 1, wherein the interface section and the vibration reduction structure are located in a load path for the first component and the second component.

7. The apparatus of claim 1, wherein the first component and the second component are connected to the each other using at least one of a number of fasteners, a number of welds, and an adhesive.

8. The apparatus of claim 1, wherein the interface section and the vibration reduction structure are comprised of a material selected from one of aluminum, titanium, steel, nickel, plastic, and a composite material.

9. The apparatus of claim 1, wherein the first component and second component are located in a platform selected from one of a mobile platform, a stationary platform, a land-based structure, an aquatic-based structure, a space-based structure, an aircraft, a helicopter, a submarine, a bus, a personnel carrier, a tank, a train, an automobile, a spacecraft, a space station, a satellite, a surface ship, a power plant, a dam, and a manufacturing facility.

10. The apparatus of claim 1, wherein the first component is selected from one of a fuselage, a fairing, an engine, and a skin panel and wherein the second component is selected from one of a sensor, an infrared camera, a video camera, and an antenna.

11. An assembly for an aircraft, wherein the assembly comprises:
a first component for the aircraft;
a second component for the aircraft, wherein the first component is connected to the second component; and
a vibration reduction part attached between the first component and the second component, wherein the vibration reduction part comprises a substantially planar member with a number of holes, the substantially planar member having a first side and a second side positioned opposite each other, a number of fasteners connecting the first component to a first side of the substantially planar member and a number of members extending on opposite sides of the second side of the substantially planar member, wherein in response to a first number of frequencies, the number of members is configured to vibrate at a second number of frequencies substantially equal to at least a portion of the first number of frequencies in the first component such that vibrations are reduced in the second component, each member in the number of members comprising a first portion having a first mass and a second portion having a second mass, the first mass greater than the second mass, wherein the substantially planar member is positioned between a first component and a second component that are connected to each other and wherein the vibration reduction structure reduces the vibrations at the number of frequencies that encounter the substantially planar member and the vibration reduction structure such that the vibrations in the first component that reach the second component are reduced, the number of members positioned with a clearance to the second component, and the second component comprises an antenna, a member in the number of members moves in response to the vibrations in a manner that reduces the vibrations, a movement of the member is in a lateral direction with respect to the antenna.

12. The assembly of claim 11, wherein a member in the number of members has a clearance with respect to the first component and the second component such that the member moves in response to the vibrations in a manner that reduces the vibrations in the second component, a movement of the member is in a lateral direction with respect to the second component.

13. The assembly of claim 11, wherein the substantially planar member and the vibration reduction part are comprised of a material selected from one of aluminum, titanium, steel, nickel, plastic, and a composite material.

14. The assembly of claim 11, wherein the first component is selected from one of a fuselage, a fairing, an engine, and a skin panel and wherein the second component is selected from one of a sensor, an infrared camera, a video camera, and an antenna.

15. The assembly of claim 11, wherein the aircraft is selected from one of an airplane and a helicopter.

16. A method for reducing vibrations in an assembly, the method comprising:
receiving the vibrations at a first component in the assembly, wherein the assembly comprises the first component connected to a second component with a vibration reduction part being attached between the first component and the second component and wherein the vibrations have a number of frequencies, the vibration reduction part comprising a substantially planar interface section having a first side and a second side positioned opposite each other, the first component positioned on the first side and the second component positioned on the second side;

reducing the vibrations that reach the vibration reduction part from the first component, wherein the vibration reduction part comprises the interface section and a vibration reduction structure associated with the interface section and wherein the vibration reduction structure extends from a surface of the interface section, the vibration reduction structure comprising a number of members extending on opposite sides of the first surface, each member in the number of members comprising a first portion having a first mass and a second portion having a second mass, the first mass greater than the second mass; and moving a member in the number of members so as to clear the second component and in a direction lateral to the second component.

17. The method of claim 16, wherein the vibration reduction part reduces the vibrations in the first component that reach the vibration reduction part such that the vibrations that travel to the second component are reduced.

18. The apparatus of claim 7, wherein the interface section distributes a load of a threaded fastener of the number of fasteners that connects the first component to the second component.

* * * * *